June 26, 1962  V. E. AYRE  3,041,465
AUXILIARY POWER SUPPLY
Filed May 31, 1960
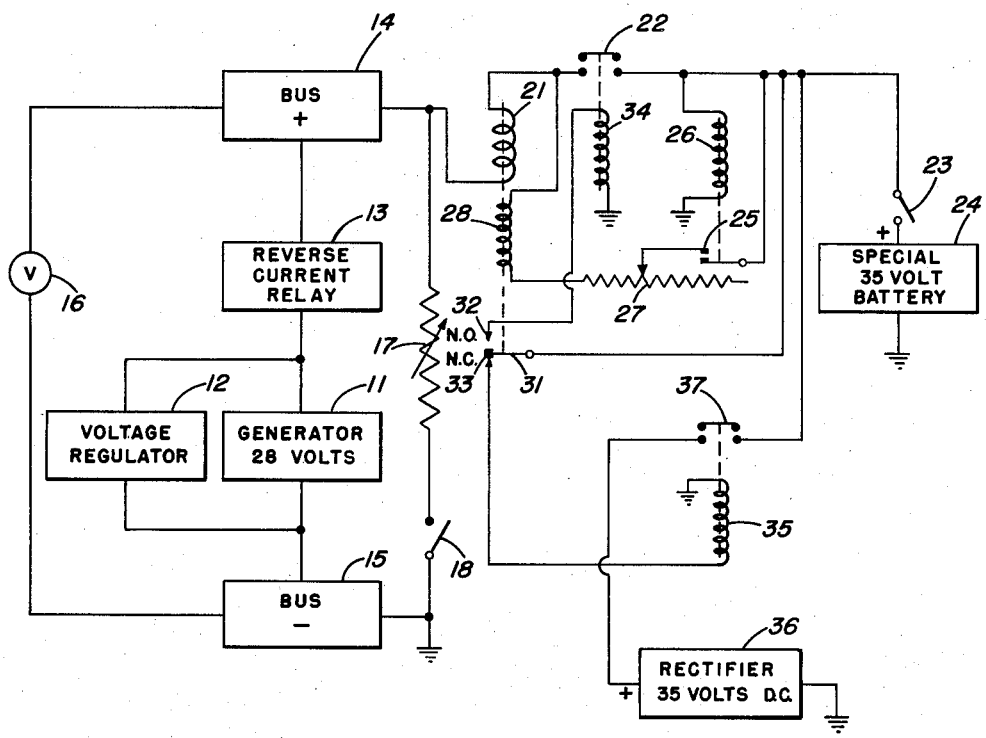
Inventor
VIVIAN E. AYRE
By R. J. Tompkins
Attorney

United States Patent Office 3,041,465
Patented June 26, 1962

3,041,465
AUXILIARY POWER SUPPLY
Vivian E. Ayre, Washington, D.C., assignor to the United States of America as represented by the Secretary of the Navy
Filed May 31, 1960, Ser. No. 33,066
7 Claims. (Cl. 307—64)
(Granted under Title 35, U.S. Code (1952), sec. 266)

The invention described herein may be manufactured and used by or for the Government of the United States of America for governmental purposes without the payment of any royalties thereon or therefor.

The present invention relates to an auxiliary power supply system and more particularly to an auxiliary power supply system for use on aircraft wherein the load current is normally supplied by an engine-driven direct current generator, but when the generator voltage decreases below a predetermined value, or becomes inoperative, then a battery will act as the auxiliary power supply.

In the past aircraft auxiliary power supply systems consisted of a generator and some other secondary source, possibly a battery, but the secondary source generally came into operation only upon manual operation by the pilot of the aircraft. Furthermore, even if the system was made to be automatic, disastrous results often occurred if, when the secondary source was required, it was found that the battery was discharged. Consequently, diligent and repeated inspection and maintenance was required to assure perfect functioning and reliability with respect to the auxiliary system.

In contrast with the above described systems the present invention offers reliable operation with a minimum of attention, and the aircraft pilot can count on always having an adequate supply of power at all times because a rectifier keeps the battery fully charged and circuit design operates to substitute either generator or battery in the load circuit automatically whenever either source of potential falls below par.

The battery is charged by a rectifier that has a power supply of 220 volt, 3-phase, 400 cycle alternating current now used in all aircraft. This type of rectifier is designed to limit the maximum initial charging current to 50 amperes, as a silver-zinc-oxide aircraft battery cannot be fully charged at higher currents. The maximum charging voltage is 35.0 volts, namely, an average of 2.06 volts per cell.

The silver-zinc oxide aircraft battery cannot be overheated by charging over a long period of time. As the battery approaches the fully charged state, the charging current gradually falls from a maximum of 50 amperes to a minimum of one ampere or less. Therefore overheating cannot take place as a result of overcharging.

Under normal conditions the load is carried by the generator and the battery is on charge across the rectifier. The generator normally supplies 28.0 volts to the load and the rectifier will maintain the battery at 35.0 volts when fully charged. A voltage differential relay connected across the positive busses of the load and the battery is the primary activating device. When the voltage difference between the busses exceeds a predetermined value, the battery is disconnected from the charging rectifier by a polarized differential relay and connected to the load.

A "peroxide" voltage exists in the battery when it is fully charged. Since this condition may open the reverse current relay in the generator, the load is across the battery until its voltage has decreased to a value that enables the generator to resume active operation in the circuit. The high-current drain from the battery will rapidly eliminate the peroxide voltage, which may damage delicate equipment unless it is reduced, and, furthermore, it is unstable.

When the conditions in the circuit change that enable the generator to charge into the system, a second reverse current relay prevents the generator from charging the battery. At the same time, the polarized differential relay operates to connect the battery across the rectifier and resume its charge.

The system will supply current to the load as long as the battery is not completely discharged when either or both charging devices fail. The operating relays in the circuit are energized by the battery and will disconnect it from the system if a failure of the battery occurs.

An object of the invention is the provision of an auxiliary power supply wherein either a generator or battery is automatically connected to the load.

Another object is the provision of an auxiliary power supply which operates if the primary potential source falls below a predetermined level.

Still another object is the provision of an auxiliary power supply wherein the battery is always maintained in a fully charged condition.

A further object is the provision of an auxiliary power supply wherein the operating relays in the circuit are energized by the battery.

Other objects and many of the attendant advantages of this invention will be readily appreciated as the same becomes better understood by reference to the following detailed description when considered in connection with the accompanying drawing wherein:

The FIGURE shows a schematic diagram of the circuit comprising the present invention.

Referring now to the single figure of the drawing there is shown a conventional direct current generator 11 which functions as the primary source of potential in the system. In parallel with generator 11 is a customary voltage regulator 12, of any standard design, while in series with the generator is a reverse current relay 13, the entire arrangement being connected in turn to bus-bars 14 and 15. A voltmeter 16 is connected across bus-bars 14 and 15 to indicate the potential being supplied by the system. Also connected across busses 14 and 15 is a load 17 shown here as being adjustable since the operation of various pieces of equipment on the aircraft will effectively vary the load on the power supply. An off-on switch 18, in series with the load 17 is used to connect it to the generator.

At the junction of bus 14 and one end of load 17 there is connected a reverse current coil 21, the opposite end of which joins a discharge contactor 22, this contactor in turn connecting through an off-on switch 23 with a special silver-oxide-zinc 35 volt battery 24. The battery 24 operates as the auxiliary source of potential for the system.

Also connected to switch 23 is contacts 25 of a voltage relay 26, the contacts 25 leading to the movable arm of a differential voltage adjustment rheostat 27 which is series connected with differential voltage relay coil 28, this in turn joining the discharge contactors 22.

Activated under the influence of reverse current coil 21 and differential voltage relay coil 28 is a movable arm 31 which pivots between fixed contacts 32 and 33, contact 32 in turn being connected to coil 34 which activates discharge contactor 22. Movable arm 31 is connected through switch 23 to the positive terminal of battery 24, while contact 33 has a coil 35 connected in series between it and ground.

In order to maintain the battery 24 in a fully charged condition there is furnished a rectifier 36 which supplies current through a charging contactor 37 to the battery 24. It will be observed that the current flowing in coil 35 activates the charging contactor 37 to place the rectifier into the battery circuit.

In operation the invention functions as follows: Under normal conditions the generator 11, through the action of voltage regulator 12 supplies a steady flow of current at constant voltage through reverse current relay 13 to the bus-bars 14 and 15, this current flowing through load 17 when switch 18 is closed. When the battery 24 is connected to the circuit by closing off-on switch 23 the voltage relay 26 is energized closing contacts 25 to complete a circuit through voltage adjustment rheostat 27, differential voltage relay 28, reverse current coil 21, and load 17 to ground. At the same time a circuit is completed from the battery through movable arm 31, contact 33 and coil 35 to close charging contactor 37 thereby connecting rectifier 36 to battery 24.

The battery then remains on charge until the load, or some other condition, causes the generator voltage to drop to 25.0 volts, or some other predetermined value. When this situation occurs this voltage difference activates the differential voltage relay, and movable arm 31 shifts from contact 33 to contact 32 opening charging contactor 37 through the deenergizing of coil 35 thereby removing the rectifier 36 from the battery. When arm 31 shifts to contact 32 coil 34 is energized to close discharging contactor 22, placing the battery directly across the load. Meantime reverse current relay 13 prevents current from flowing through the generator. As long as the battery voltage exceeds the generator voltage, the battery will carry the full load, but after the two voltages are equalized, the generator and the battery both will carry the load.

When the generator voltage exceeds the battery voltage, caused by a decrease in the load or the battery voltage, current will flow through the reverse current coil 21 in the opposite direction. This reverse current operates the differential voltage relay so that movable arm 31 shifts from contact 32 to contact 33 deenergizing coil 34 so that discharging contactor 22 opens, and at the same time energizing coil 35 so that charging contactor 37 closes, thereby putting the battery on charge again. The generator then will carry the load.

Should a generator failure occur, current through differential voltage relay coil 28 will cause movable arm 31 to shift to contact 32 closing discharge contactor 22, immediately connecting the battery to the load, reverse current relay 13 again protecting the generator from damage by the battery current.

Destruction of the battery, or any other battery failure, deenergizes voltage relay 26. This operation disconnects the battery from the system and eliminates the danger of short circuits that could be caused by a damaged battery circuit.

Obviously many modifications and variations of the present invention are possible in the light of the above teachings. It is therefore to be understood that within the scope of the appended claims the invention may be practiced otherwise than as specifically described.

What is claimed is:

1. An auxiliary power supply system comprising a primary source of voltage, a load connected across said primary source, a secondary source of voltage connected in parallel with the primary source across the load, a differential voltage coil connected to the primary source of voltage, said differential voltage coil also being connected to said secondary voltage source so that the coil is responsive to the voltages of both the primary and secondary sources, and means activated by the differential voltage coil to connect either the primary or the secondary voltage sources across the load.

2. The auxiliary power supply system of claim 1 wherein the primary source of voltage is a generator and the secondary source of voltage is a battery.

3. An auxiliary power supply system comprising a generator, a load connected across the generator, a battery also connected across the load, voltage sensing means connected to the generator and the battery and responsive to the difference between the generator and battery voltages for placing one or the other across the load, rectifier means, and means to connect the rectifier to the battery when the battery is not connected to the load.

4. An auxiliary power supply system comprising a generator, a reverse current relay in series with the generator, a load connected across the generator and reverse current relay, a voltage differential coil connected to said generator, a reverse current coil also connected to said generator, a battery, a voltage relay connected to said battery for applying potential to the voltage differential coil and reverse current coil, a rectifier, and means activated by the voltage differential coil and reverse current coil for connecting either the load or the rectifier across the battery.

5. An auxiliary power supply system comprising a generator, a reverse current relay in series with the generator, a battery, a load connected across the generator and reverse current relay, a voltage differential relay connected so as to be subject to potentials from both the generator and the battery, a reverse current coil also connected so as to be subject to potentials from both the generator and the battery, and relay means activated by the voltage differential relay and reverse current coil to apply the generator to the load when the generator potential exceeds the battery potential and to apply the battery to the load when the battery potential exceeds the generator potential.

6. An auxiliary power supply system comprising a generator, a battery, a load connected across the generator, a voltage relay connected to the battery, a differential relay in series with the voltage relay, the coil of said differential relay being connected so as to be subject to both the generator and battery potentials, first and second contacts on said differential relay, a discharge contactor connected to said first contact, a charging contactor connected to said second contact, a reverse current coil connected between the discharge contactor and the load, and a rectifier connected to the charging contactor whereby when potential from the battery is applied to the voltage relay the differential relay is energized and if the generator potential is lower than the battery potential then the differential relay causes the discharging contactor to apply the battery potential to the load but if the generator potential is higher than the battery potential then the differential relay causes the charging contactor to apply the rectifier to the battery.

7. An auxiliary power supply system comprising a generator, a reverse current relay in series with the generator, a load connected across the generator and reverse current relay, a reverse current coil connected to said load, a battery, a differential relay having a differential coil, movable arm and first and second contacts, a voltage relay connected to the battery to apply potential to the differential coil, the arm of said differential relay being adapted to be activated by either the differential coil or the reverse current coil, a discharge contactor connected to said first contact for applying the battery to the load, a rectifier, and a charging contactor connected to said second contact for applying the rectifier to the battery, whereby either the generator or the battery is applied to the load should the potential of either fall below a predetermined level and the battery is kept fully charged when not in use.

References Cited in the file of this patent

UNITED STATES PATENTS

| Re. 16,383 | Moss et al. | July 13, 1926 |
| Re. 19,848 | Beetem | Feb. 11, 1936 |
| 344,948 | De Salome | July 6, 1886 |